United States Patent [19]

Dalal et al.

[11] Patent Number: 5,307,445
[45] Date of Patent: Apr. 26, 1994

[54] QUERY OPTIMIZATION BY TYPE LATTICES IN OBJECT-ORIENTED LOGIC PROGRAMS AND DEDUCTIVE DATABASES

[75] Inventors: Mukesh Dalal, Piscataway, N.J.; Dipayan Gangopadhyay, Brewster, N.Y.

[73] Assignee: International Business Machines Corporation, Armonk, N.Y.

[21] Appl. No.: 801,323

[22] Filed: Dec. 2, 1991

[51] Int. Cl.$^5$ ............................................. G06F 9/00
[52] U.S. Cl. ....................................................... 395/66
[58] Field of Search .......................................... 395/66

[56] References Cited

U.S. PATENT DOCUMENTS

| | | | |
|---|---|---|---|
| 4,276,597 | 6/1981 | Dissly et al. | 364/300 |
| 4,318,184 | 3/1982 | Millett et al. | 364/900 |
| 4,546,432 | 10/1985 | Umemura et al. | 364/200 |
| 4,620,286 | 10/1986 | Smith et al. | 364/513 |
| 4,620,295 | 10/1986 | Aiken, Jr. | 364/900 |
| 4,760,523 | 7/1988 | Yu et al. | 364/200 |

OTHER PUBLICATIONS

Natarajan et al., "Adaptive Optimization of Recursive Search Trees", IBM Technical Disclosure Bulletin, vol. 31, No. 1, pp. 415-417, 1988.

Kaci et al., "Logic and Inheritance", Proceedings of ACM SIGPLAN-SIGACT Conference on Principles of Programming Languages, Microelectronics and Computer Technology Corporation, pp. 219-228, 1986.

Primary Examiner—Allen R. MacDonald
Attorney, Agent, or Firm—Heslin & Rothenberg

[57] ABSTRACT

Processing techniques for enhancing execution of programs written in a logic-oriented programming language such as PROLOG are disclosed. The techniques are particularly useful for programs having class predicates and subclass predicates which are definitive of a class/subclass hierarchy, such as the case with PROLOG's application in object-oriented programming systems, expert systems, object-oriented databases, object-oriented deductive databases, knowledge representations, etc. The techniques ensure that searching within the type hierarchy takes precedence over searching of instances of types. Important to accomplishing this function is the pre-assigning of ranks to predicates and clauses within the program to be processed. Query processing on the program is then based upon the pre-assigned predicate and clause rankings. In particular, novel rules are substituted for conventional predicate and clause selection rules of PROLOG interpreters such that predicates and clauses are preferably processed in order of ranking. In addition, certain query processing simplification steps are introduced. The net effect is a technique which eliminates redundant and unnecessary searching at the instance level by taking advantage of information available in the type lattice.

21 Claims, 4 Drawing Sheets

QUERY OPTIMIZATION BY TYPE LATTICES IN OBJECT-ORIENTED LOGIC PROGRAMS AND DEDUCTIVE DATABASES

BACKGROUND OF THE INVENTION

1. Field of the Invention

This invention relates generally to electronic digital computing and, more particularly, to a processing technique for executing queries in presence of type hierarchies using a logic-oriented language such as PROLOG, i.e., programs written in a programming language referred to in the art as PROLOG (PROgramming in LOGic).

2. Description of the Prior Art

A PROLOG program is written as a sequence of clauses. For example, a clause is written as follows to describe that Mary likes vegetables:

$$\text{Likes(Mary,X)} \leftarrow \text{Vegetables(X)}. \quad (1)$$

In a clause, ← (or :—) is a logic symbol and the expressions on both sides of a logic symbol are called predicates. The words exemplified by "likes" and "vegetables" are referred to herein as predicate names. The word "Mary" and letter "X" are called arguments. A letter argument, e.g. "X", is a variable argument, and a word argument such as "Mary", is a constant argument.

Each predicate defines a relationship and includes a predicate name and a sequence of one or more arguments. The lefthand side of the logic symbol is called a head and the righthand side a body. A clause may have only the head. A clause having both a head and the body is called a rule, while a clause having only the head is called a fact (or an instance of predicate).

The predicate of the head and the predicate of the body are herein referred to as head predicate and body predicate, respectively. The head of a regular or a declaratory clause consists of only one head predicate, while the body of a regular or an interrogatory clause consists of one or more body predicates. When a body consists of N predicates, a comma is interposed between adjacent ones of the body predicates as follows:

$$\text{Predicate(H)} \leftarrow \text{Predicate(1)}, \ldots, \text{Predicate(N)}. \quad (2)$$

In clause (2), "Predicate(H)" represents a head predicate while "Predicate(1)" through "Predicate(N)" represent body predicates, N in number. The comma used between the body predicates is a logic symbol which means AND. Stated otherwise, the event represented by the head predicate is true only when all events represented by "Predicate(1)" through "Predicate(N)" hold. Let it be assumed that there is another clause in addition to clause (1) such that:

$$\text{Vegetables(carrots)}. \quad (3)$$

The sequence of clauses (1) and (3) represents the syllogistic deduction that Mary likes carrots.

As with most programming languages, it is possible to execute a PROLOG program on a conventional computer. Moreover, high-grade machinery is known in the art which is capable of processing various programming languages such as PROLOG. Also, dedicated PROLOG program processors are known, e.g., reference U.S. Pat. No. 4,546,432, by Umemura et al., entitled "PROLOG processing system."

Often, a class/subclass hierarchy (also referred to herein as a type hierarchy) is defined by a program to be processed. In such a hierarchy, there are typically one or more common nodes within the lattice. However, by definition, there are necessarily a smaller number of classes (types) in a particular program than there are objects (instances) in the search space. In PROLOG, a program representable as a type lattice is said to contain both type predicates and predicate instances. A type predicate comprises a predicate representative of a class of defined constants, while a predicate instance is a predicate with all arguments bound to constants (i.e., a fact).

Conventional PROLOG program processing utilizes certain predicate selection and clause selection strategies which almost always result in searching at the predicate instance level when query processing. However, in the presence of type hierarchies, searching type predicates before searching all predicate instances can result in enormous savings of query processing time. The present invention is directed to certain novel techniques for implementing such a concept.

Of the known prior art references, only the technique described by Kaci et al. in an article entitled "Logic and Inheritance," Proceedings of ACM SIGPLAN-SIGACT Conference on Principles of Programming Languages, discusses type lattice processing in a logic programming language. The approach described therein incorporates a processing of a type hierarchy during the unification (herein called matching) process. However, there is no mention of insuring that type predicates are processed before instance level searching occurs. Thus, the present invention is believed to offer a superior approach in terms of reducing search space.

DISCLOSURE OF THE INVENTION

Briefly described, the present invention comprises an improved method for executing queries on a program written in a logic-oriented computer programing language. The query processing method is specifically designed for programs having taxonomic classifications definitive of a class/subclass hierarchy of predicates and clauses. The method includes the steps of: preassigning rankings to the predicates and clauses of the program based upon the class/subclass level hierarchy; and query processing on the program using the assigned rankings of predicates and clauses. The program query is executed such that class level searching of predicates/clauses is accomplished before subclass or instance level searching thereof. In the specific embodiment described herein, the logic-oriented computer programming language comprises PROLOG. In addition to selecting predicates and clauses based upon rankings, certain simplification rules are preferably interleaved with the traditional PROLOG search strategy.

The modified selection rules and simplification rules presented herein result in a strategy of query evaluation which produces type level searching before instance level searching. This advantageously results in significant savings in query processing time (cost). Further, the technique of encoding a type hierarchy by ranks of type predicates requires only minimum modifications to existing PROLOG interpreters. The disclosed techniques can speed up tremendously (by orders of magnitude) applications of PROLOG for expert systems, object-oriented databases, object-oriented deductive databases, and knowledge representations. In addition, the concepts presented are applicable to processing of programs written in other object-based logic programming languages.

BRIEF DESCRIPTION OF DRAWINGS

These and other objects, advantages and features of the present invention will be more readily understood from the following detailed description of certain preferred embodiments thereof, when considered in conjunction with the accompanying drawings in which.

BEST MODE FOR CARRYING OUT THE INVENTION

In general, the present invention encompasses certain techniques for improving query processing time in object-oriented logic programming languages. The techniques are useful for programs written in such languages wherein class predicates and subclass predicates are defined such that a class/subclass hierarchy exists (referred to herein as a type hierarchy or type lattice). In such a case, program processing traditionally proceeds with a search strategy which results in significant processing at the instance level. Pursuant to the present invention, however, type hierarchies are considered before the processor searches over the instances of types.

To accomplish such a processing prioritization, the present invention implements, along with alternative predicate selection techniques, a ranking of predicates/clauses concept and certain query processing simplification steps. The inventive technique is described herein in terms of encoding a type hierarchy by ranking type predicates of a program to be executed by a PROLOG processing system. The technique requires minimal modification to conventional PROLOG interpreters. (Those skilled in the art, however, will recognize that the concepts described herein can be readily extrapolated for program processing in other object-based programming languages. The claims appended hereto are intended to encompass any such extrapolation.)

Figure 1:
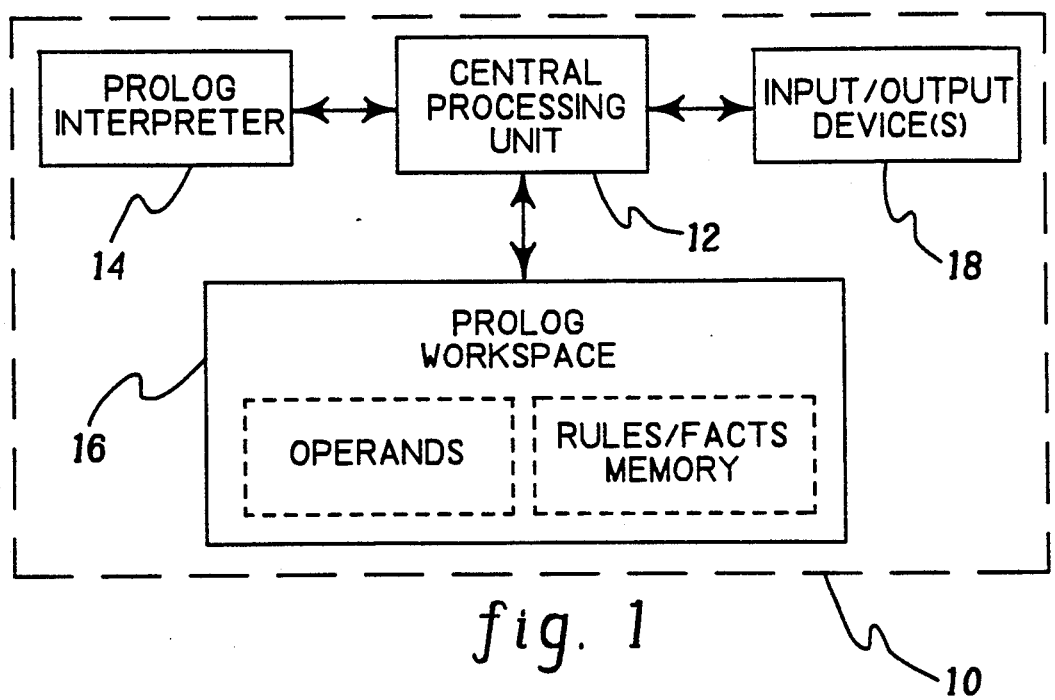
FIG. 1 is a block diagram of a PROLOG program processing system.

One generalized embodiment of a PROLOG processing system, denoted 10, is depicted in FIG. 1. As shown, system 10 includes a central processing unit 12 and a PROLOG interpreter 14, which comprises the PROLOG instructions to be executed. Central processing unit 12, after obtaining an instruction from interpreter 14, interprets the instruction, and selects an appropriate operand from a PROLOG workspace 16. Workspace 16, which also contains the particular rules/facts in memory for the program to be executed, comprises the variable portion of the program processing. CPU 12 stores back into workspace 16 the result of a selected instruction. An input/output device(s) 18 is also coupled to unit 12 for user interface with the processing system 10.

Figure 2:
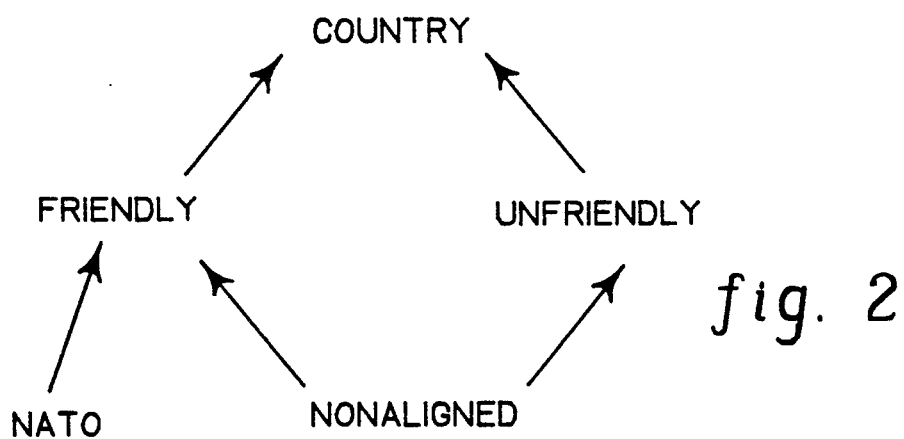
FIG. 2 exemplifies a simple type lattice for a sample PROLOG program to be processed pursuant to the present invention.

Conventional query processing of a PROLOG program and query processing of a PROLOG program pursuant to the present invention are described and compared herein with reference to the simple type hierarchy example of FIG. 2. In this example, "Friendly" and "Unfriendly" are two subtypes (subclasses) of the type "Country". Further, "Non-aligned" countries are defined as both "Friendly" as well as "Unfriendly", (i.e., subtypes thereof). Also, a "NATO" country is defined as a subtype of a "Friendly" country. The type hierarchy is supplemented with certain instances as follows: "Country A" is a "NATO" country; "Country B" is a "Non-Aligned" country; and "Country C" is an "Unfriendly" country. In addition, certain information exists within the program to be processed. For example, assume the following: (1) all "Unfriendly" countries are dangerous to visit; and (2) a visit to a country is adventurous if the country is dangerous but "Friendly".

In PROLOG programming, the outlined type hierarchy is expressed by the following clauses (or rules):

1. Country(X) :— Friendly(X).
2. Country(X) :— Unfriendly(X).
3. Friendly(X) :— NATO(X).
4. Friendly(X) :— Non-Aligned(X).
5. Unfriendly(X) :— Non-Aligned(X).

The rules for visiting are given as follows:

6. Dangerous_Visit(X) :— Unfriendly(X).
7. Adventurous_Visit(X) :—Friendly(X), Dangerous_Visit The instances are represented by the following PROLOG program facts:

8. NATO(Country A)

9. Non-Aligned(Country B)

10. Unfriendly(Country C)

Given the above programming, assume that a query is made asking for all the countries that are adventurous to visit. This can be expressed as:

?— Adventurous_Visit(X). (*)

Figure 3A:
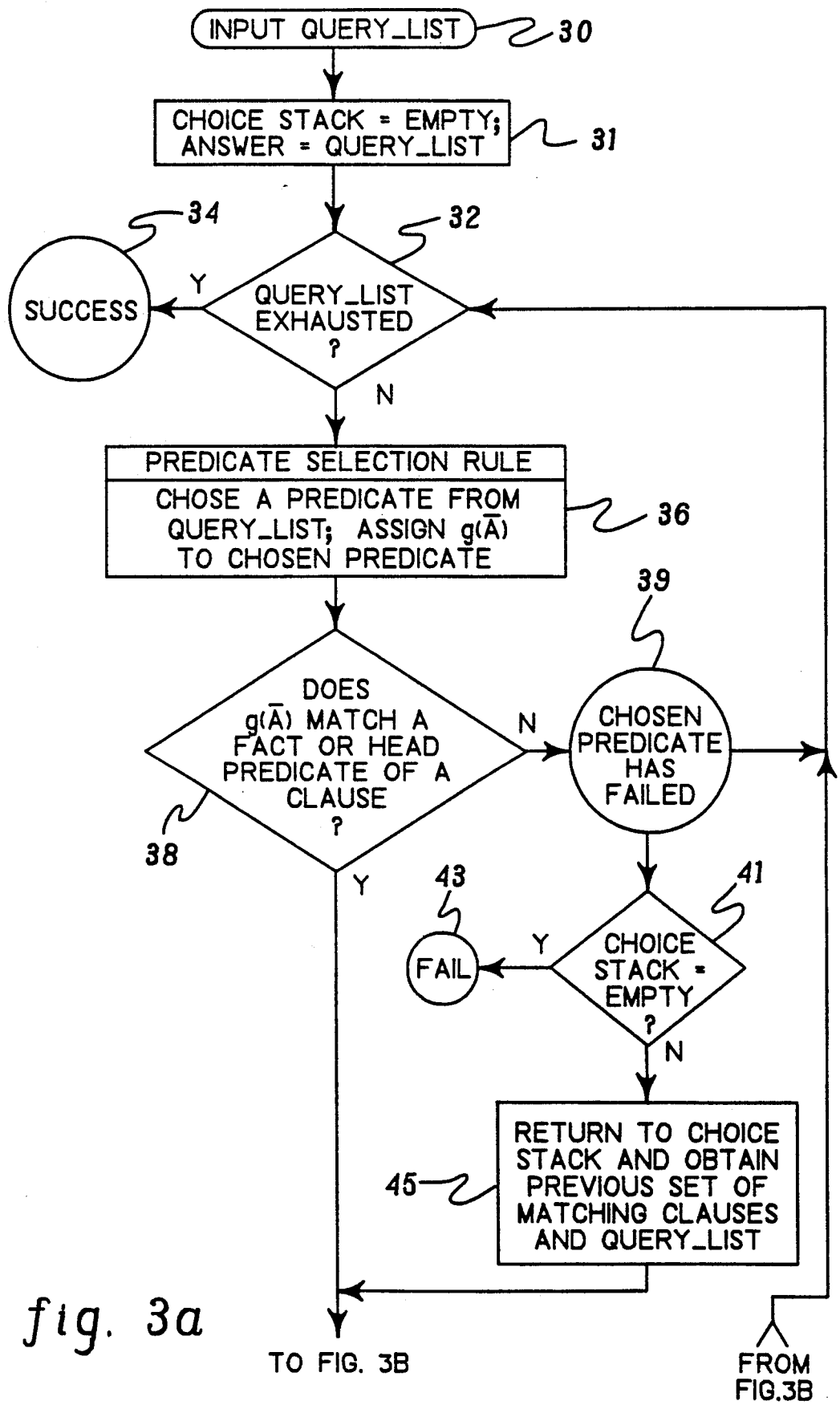
FIGS. 3a and 3b are a flowchart useful in describing PROLOG program query processing pursuant to the present invention.
Figure 3B:
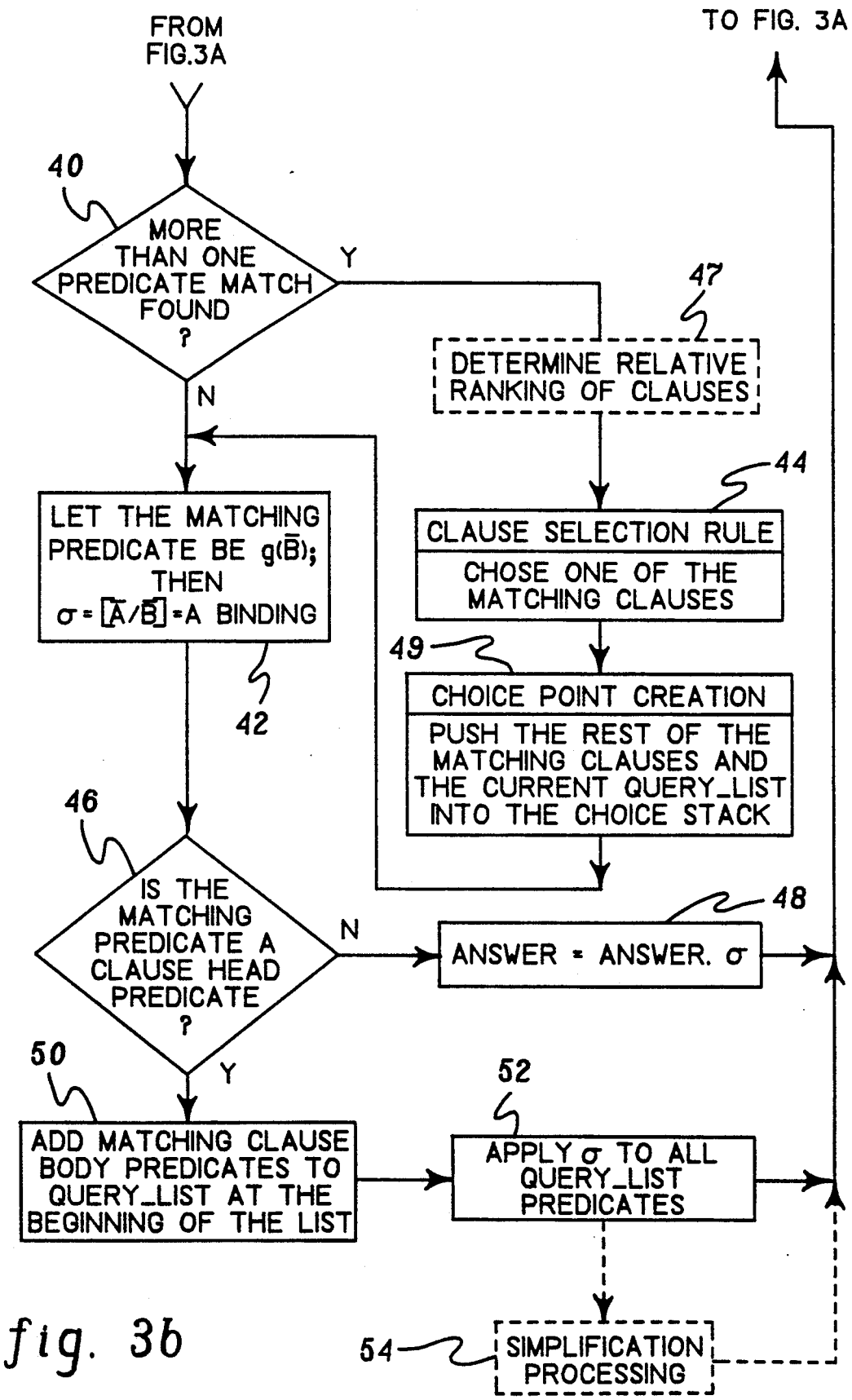

Traditional PROLOG program processing of the above-referenced query is first described below with reference to the flowchart of FIGS. 3a and 3b.

Initially, a query (such as query (*)) is input to the processor, 30 "Input Query_List," subsequent which a first variable 'Choice Stack' is cleared and a second variable 'Answer' is assigned the inputted Query_List, 31 "Choice Stack=Empty; Answer=Query_List." Inquiry is then made as to whether the Query_List has been exhausted, 32 "Query_List Exhausted?" If "yes", then the query input has been successfully processed, 34 "Success." In such a case, the 'Answer' list will contain the query predicate(s) in which the variables are bound to appropriate constants such that the successful query is deemed logically true for those bindings.

Assuming that the Query_List has just been input, then a 'Predicate Selection Rule' is accessed for processor selection of a predicate from the Query_List. The selected predicate is assigned identifier g(A), 32 "Predicate Selection Rule - Choose a Predicate From Query—List; Assign g($\overline{A}$) to Chosen Predicate." Traditionally, PROLOG interpreters instruct the processor to select the leftmost predicate in the Query—List. This instruction is a conventional example of what is referred to herein as the "Predicate Selection Rule", which is a first rule to be changed pursuant to the present invention (discussed below).

Next, processing determines whether the chosen predicate matches a predicate instance or clause head predicate in the PROLOG workspace, 38 "Does g($\overline{A}$) Match a Fact or Head Predicate of a Clause?" If "no", the chosen predicate has failed, 39 "Predicate Has Failed" and processing proceeds to inquire whether the choice stack is empty, 41 "Choice Stack=Empty?". If "yes", then the Query—List has failed, 43 "Fail." A failed Query—List means that the query cannot be answered from the program. Should the choice stack contain an entry, then the processor returns to the choice stack and obtains the previous set of matching clauses in the Query—List at that point, 45 "Return to Choice Stack and Obtain Previous Set of Matching Clauses in Query List."

If the chosen predicate matches a predicate instance or a clause head predicate, the processor inquires whether more than one predicate match has been found, 40 "More Than One Predicate Match Found?" If "no", the matching predicate instance or clause head predicate is assigned identifier g($\overline{B}$) and a binding or substitution of the identified instance of predicate or clause head predicate is made, 42, "Let The Matching Predicate Be g($\overline{B}$); Then Set $\sigma=[\overline{A}/\overline{B}]=A$ Binding." Conversely, if more than one predicate match is found, then the processor accesses a "Clause Selection Rule" and chooses one of the matching clauses for further processing, 44 "Clause Selection Rule - Choose One of the Matching Clauses".

Traditionally, PROLOG interpreters instruct the processor to select the uppermost clause in a listing of predicate instances/clause head predicates which match the subject predicate under processing. This conventional "Clause Selection Rule" is a second rule to be changed pursuant to the present invention (discussed below). (As a prerequisite thereto, a relative ranking of the matching clauses is necessary, 47 "Determine Relative Ranking of Clauses.") After selecting a particular clause for processing, a choice point (i.e., fork in the processing path) is defined to which the processor will return should the chosen clause fail, 49 "Choice Point Creation; Push Rest of the Matching Clauses and the Current Query—List Into the Choice Stack." As noted above with respect to inquiry 41, if all of the choices in the choice stack fail, then the query must fail.

From instruction 49, the processor is directed to instruction 42. Thereafter, inquiry is made into whether the matching predicate is a clause head predicate, 46 "Is the Matching Predicate a Clause Head Predicate?," and if "no", the answer to the subject predicate has been identified, 48 "Answer=Answer $\sigma$", i.e., the substitution $\sigma$ is applied to Answer. Thus, the matching predicate comprises a predicate instance which substitutes for the subject predicate being processed. Thereafter, return is made to inquiry 32 "Query—List Exhausted?" If "no", then another predicate (i.e., the next leftmost predicate) is selected and processing continues as described above.

If the predicate matches a clause head predicate, the processor adds the clause's body predicates to the Query—List at the beginning of the list, 50 "Add Matching Clause's Body Predicates to Query—List At The Beginning of The List," and thereafter applies the binding ($\sigma$) to all Query—List predicates, 52 "Apply $\sigma$ to All Query—List Predicates." After making the substitution, processing returns to inquiry 32 "Query—List Exhausted?" As explained below, pursuant to the present invention certain query simplification processing rules are preferably interleaved with the main program processing at this point, i.e., prior to return of processing to inquiry 32, 54 "Simplification Processing."

As noted, PROLOG's interpreters traditionally define the "Predicate Selection Rule" such that the processor selects the leftmost predicate in the query for initial processing (i.e., at instruction 36). In addition, for the case where more than one predicate match is found, the interpreters define the "Clause Selection Rule" (i.e., at instruction 44) so that the processor selects the uppermost clause in a top-down listing of clause matches (i.e., the first clause which resolves with the subject predicate). Both of these rules often result in unnecessary query processing since significant time is usually spent evaluating instances of types rather than focusing on processing the less numerous type predicates.

For example, returning to the type hierarchy of FIG. 2, conventionally PROLOG's interpretation or search strategy would initially resolve the query with clause 7, then resolve Friendly(X) with clauses 3 and 8, binding variable (X) to Country A. The substitution Dangerous—Visit(Country A) is then made which is resolved with clause 6 before failing. At this point the processor backtracks to predicate query Friendly(X), which is then resolved with clause 4, and thereafter, with clauses 9, 6, 5 and 9 again. All this processing will ultimately produce the result that X=Country B. Note that adding additional friendly countries simply leads to a greater amount of process backtracking. Again, the left first, top down processing of PROLOG's traditional predicate selection and clause selection rules, respectively, result in significant instance level processing.

Pursuant to the present inventive technique, novel predicate and clause selection rules are introduced. These new predicate and clause selection rules require the definition of an ordering among the predicates/clauses of the PROLOG program. Such an ordering is obtained by ranking the predicates. Although various approaches may be used to rank the predicates, one preferred approach is described below with reference to the flowchart of FIG. 4.

Figure 4:
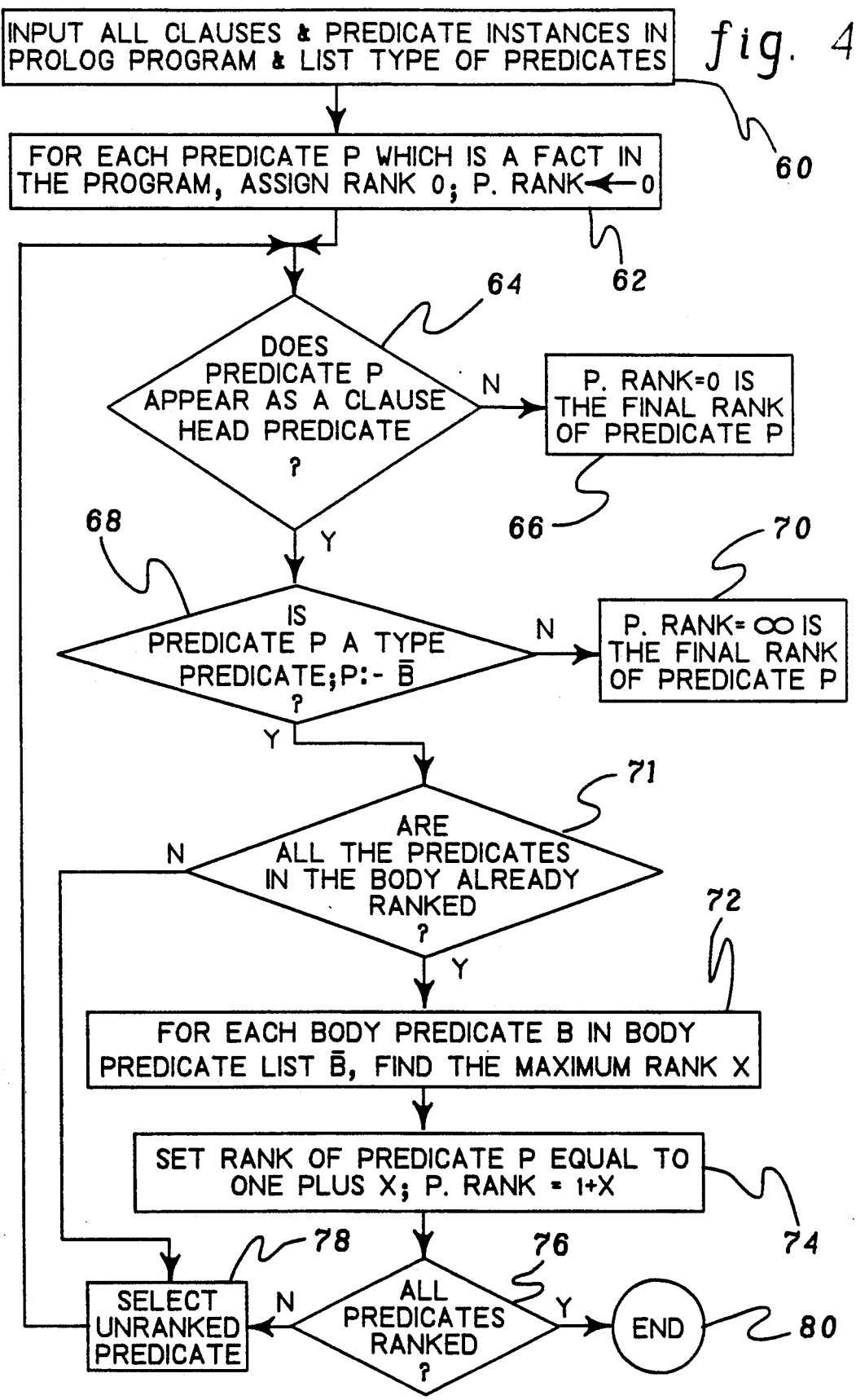
FIG. 4 is a flowchart of one embodiment of a predicate ranking technique pursuant to the present invention.

As an overview, FIG. 4 comprises a ranking scheme in which every predicate in the program is assigned a rank. For a predicate P, rank(P) is defined as: 0 if there is no clause (other than a fact) such that P is the head of the clause; $\infty$ if the predicate appears at the head of a clause and is not a type predicate; and $1+X$, where X is the maximum of the ranks of all the predicates that appear in any clause for which P is in the head. Once predicates are so ranked, the technique of the present invention is to select the leftmost predicate P whose rank (i.e., rank(P)) is greater than or equal to the rank of all other predicates Q (i.e., rank(Q)) in the query (rank(Q)$\leq$rank (P)). The new clause selection rule is to select the first clause D such that for any other clause E which can be resolved with the selected query, rank(clause E)$\leq$rank(clause D), where relative rank of a clause is defined as follows. Let C and D be two clauses with the same predicate at their head. Let $R_c$ and $R_d$ be respectively the ranks of the lowest ranking predicate in the body of clauses C and D respectively. Then rank(- clause C)≦rank(clause D) iff $R_c \leq R_d$. In case of tie, the topmost of the tied clauses is chosen.

Referring specifically to the flowchart of FIG. 4, all clauses and facts in the PROLOG program to be processed, along with the types of predicates, are initially identified, 60 "Input All Clauses & Predicate Instances in PROLOG Program and List Type of Predicates." Next, each predicate P which is a fact in the subject PROLOG program is assigned a rank 0, 62 "For Each Predicate P Which Is A Fact In The Program, Assign Rank 0; P.Rank←0." Inquiry is then made whether predicate P is a clause head predicate, 64 "Does Predicate P appear as a Clause Head Predicate?" If "no", then the final rank of predicate P is 0, 66 "P.Rank=0 Is The Final Rank For Predicate P." If "yes", then the processor determines whether predicate P is a type predicate, 68 "Is Predicate P a Type Predicate; P:-B?" If "no", then the final rank of predicate P is $\infty$, 70 "P.Rank=$\infty$ Is The Final Rank of Predicate P." If the answer to inquiry 68 is "yes", then inquiry is made as to whether all the predicates in the body are ranked, 71 "Are All the Predicates in the Body Already Ranked?" If "no", then an unranked predicate is selected for processing, 78 "Select Unranked Predicate" and return is made to inquiry 64. If all predicates in the body are already ranked, then for each body predicate in the body predicate list $\bar{B}$ for which predicate P is a clause head predicate, the maximum rank X is found, 72 "For Each Body Predicate B In Body Predicate List $\bar{B}$, Find The Maximum Rank X." The rank of predicate P is then defined as equal to one plus the maximum rank X, 74 "Set Rank of Predicate P=
1+X; P.Rank=1+X."

After ranking the particular predicate P, inquiry is made into whether all predicates have been ranked, 76 "All Predicates Ranked?" If "no", then a next unranked predicate is selected, 78 "Select Unranked Predicate," and ranking of this new predicate is accomplished as described above. Once all predicates have been ranked processing terminates, 80 "End." Where more than one predicate match is found, then before application of the clause selection rule proposed herein, the relative ranking between the identified clauses must be established (i.e., instruction 47 in the flowchart of FIGS. 3a and 3b). This is accomplished by assigning each clause C in a list of clauses $\bar{C}$ the minimum rank of the body predicates in the clause. Further, if two or more clauses have the same relative rank, then the uppermost of the clauses in the list is to be processed first pursuant to the clause selection rule.

Figure 5:
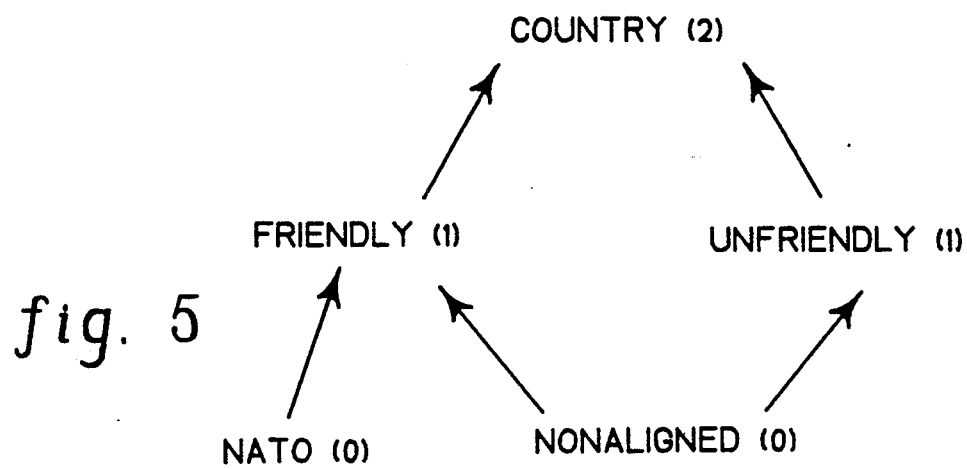
FIG. 5 exemplifies the type lattice of FIG. 2 with rankings assigned pursuant to the present invention.

Referring to the type lattice of FIG. 5, using the ranking approach set forth above, "NATO" and "Non-Aligned" predicates are each assigned a rank 0 since both are fact predicates. "Friendly" and "Unfriendly" are each assigned the rank 1 (i.e., since each appears as a clause head predicate and since each is a type predicate, the rank is defined as one plus X, the maximum rank of the body predicate(s) in the clauses for which these terms are clause head predicates; or rank=1+0=1). Using the same analysis, "Country" is defined as rank 2 (i.e., rank=1+1=2). "Dangerous_Visit" and "Adventurous_Visit" are each assigned the rank of $\infty$ since each appears as a clause head predicate but is not a type predicate. The ordering of all predicate pairs defined by the example presented is as follows:

Rank(Friendly)≦Rank(Country)

Rank(Unfriendly)≦Rank(Country)

Rank(NATO)≦Rank(Friendly)

Rank(Non-Aligned)≦Rank(Friendly)

Rank(Non-Aligned)≦Rank(Unfriendly)

Rank(Unfriendly)≦Rank(Dangerous_Visit)

Rank(Friendly)≦Rank(Adventurous_Visit)

Rank(Dangerous_Visit)≦Rank(Adventurous_Visit).

Again, the query is:

?- Adventurous_Visit(X).

Since there is no choice here, the predicate "Adventurous_Visit(X)" is resolved with clause 7 to get the next goal.

?- Friendly(X), Dangerous_Visit(X).

Since "Dangerous_visit" has a higher rank than "Friendly", the predicate selection rule requires selection of "Dangerous_Visit" for initial processing. This predicate is resolved with clause 6 to result in the following query:

?- Friendly(X), Unfriendly(X).

Because "Friendly" and "Unfriendly" have the same rank, the leftmost one in the query comprises the predicate to be initially resolved. Also, since clause 3 and clause 4 have the same ranking, the uppermost clause, clause 3, is chosen, resulting in ?- NATO(X), Unfriendly(X).

At this point, two simplification rules are utilized. First, if two predicates in the current Query_List are identical, delete one of them. Secondly, if any two non-identical predicates in the current Query_List have a ranking 0 and have the same arguments, then declare a failure. This is because predicates with a zero rank are base predicates and if they are not identical, then their types are necessary disjoint. Application of these simplification rules is preferably interleaved with the traditional PROLOG search strategy. For example, the simplification strategies could be implemented as instruction 54 in the program processing flow of FIG. 3.

Returning to the above processing example, and applying the second simplification rule, the present query ?- NATO(X), Unfriendly(X) is a failure. Referring to the alternative clause, clause 4, the following query is obtained:

?- Non-Aligned(X), Unfriendly(X).

The next predicate selected is "Unfriendly(X), which when resolved with clause 5, results in query:

?- Non-Aligned(X), Non-Aligned(X).

The query is then reduced by the first simplification rule to yield:

?- Non-Aligned(X).

This query of rank 0 is then resolved with a fact yielding the only answer X=Country B.

Those skilled in the art will recognize that the modified selection rules set forth herein and the two simplification rules presented result in a strategy of query evaluation which produces type level searching before any instance level searching. By focusing on type lattice searching before any instance level searching, significant savings in query processing time (cost) are obtained. Further, the technique of encoding a type hierarchy by ranks of type predicates requires only minimum modifications to existing PROLOG interpreters. The disclosed techniques can speed up tremendously (by orders of magnitude) applications of PROLOG for expert systems, object-oriented databases, object-oriented deductive databases, and knowledge representations. In addition, the concepts presented are applicable to processing of programs written in other object-based logic programming languages.

While the invention has been described in detail herein in accordance with certain preferred embodiments thereof, many modifications and changes therein may be affected by those skilled in the art. Accordingly, it is intended by the appended claims to cover all such modifications and changes as fall within the true spirit and scope of the invention.

We claim:

1. In an object-oriented logic programming language, a method for executing queries on a program having taxonomy classifications definitive of a class/subclass level hierarchy of predicates and clauses, said query executing method comprising the steps of:
   pre-assigning rankings to the predicates and clauses of said program based upon said class/subclass level hierarchy; and
   query searching said program using said pre-assigned predicate and clause rankings, said program query being executed such that class level searching of predicates/clauses takes precedence over subclass level searching of predicates/clauses and class/subclass level searching of predicates/clauses takes precedence over instance level searching of predicates/clauses.

2. The query executing method of claim 1, wherein said logic programming language comprises PROLOG.

3. The query executing method of claim 2, wherein said query contains at least two predicates, and wherein said query searching step includes choosing for initial processing a predicate from said at least two query predicates which has the highest pre-assigned ranking of said at least two predicates.

4. The query executing method of claim 3, wherein when two of said at least two query predicates are found to have the same highest ranking, said query searching includes selecting the leftmost predicate of said at least two query predicates of the same pre-assigned ranking for initial processing.

5. The query executing method of claim 2, wherein said class/subclass level hierarchy of predicates and clauses includes type predicates, clause head predicates and predicate instances, and wherein said query searching includes the steps of:
   choosing a predicate from said query for processing;
   identifying whether a predicate instance or clause head predicate in said program matches said chosen query predicate; and
   where a match is identified, binding the matching predicate instance or clause head predicate with said chosen query predicate.

6. The query executing method of claim 5, wherein said query searching further comprises the steps of:
   determining whether said chosen query predicate matches more than one predicate instance or clause head predicate in said program; and
   selecting, where multiple matches are identified, one of said matching predicate instances or clause head predicates for initial binding with said chosen query predicate.

7. The query executing method of claim 6, wherein said selecting step includes selecting the matching predicate instance or clause head predicate having the highest relative ranking for initial binding with said first chosen query predicate.

8. The query executing method of claim 7, wherein where at least two of said matching predicate instances or clause head predicates have the same pre-assigned highest ranking, said selecting step includes selecting from a list thereof the uppermost of said at least two predicates for binding with said chosen query predicate.

9. The query executing method of claim 5, further comprising applying simplification rules to the query predicates subsequent binding of a matching predicate instance or clause head predicate with said chosen query predicate.

10. The query executing method of claim 9, wherein when two predicates in said query are identical, said simplification rules dictate deleting one of said two identical queries.

11. The query executing method of claim 10, wherein said simplification rules further dictate declaring a failure and terminating query processing whenever any two non-identical predicates in the query have a pre-assigned ranking of a predicate instance and have the same arguments.

12. The query executing method of claim 2, wherein said class/subclass level hierarchy of predicates and clauses includes type predicates, clause head predicates and predicate instances and wherein an instance of predicate is assigned the lowest ranking during said rank pre-assigning step.

13. The query executing method of claim 12, wherein a clause head predicate of said program which is not a type predicate is assigned the highest ranking during said rank pre-assigning step.

14. The query executing method of claim 13, wherein each clause head predicate which is also a type predicate of said program is defined during said rank pre-assigning step as having a rank of:

$$1+X$$

wherein X is the maximum rank of the body predicates in the clause containing said clause head predicate.

15. A method for executing a PROLOG program in response to a query, said PROLOG program having a type lattice of predicates and clauses, said PROLOG program executing method comprising the steps of:
   pre-assigning rankings to the predicates and clauses of said program based upon said type lattice; and
   searching said program using said pre-assigned predicate and clause rankings, said program query being executed such that type level searching of predicates/clauses takes precedence over instance level searching of predicates/clauses.

16. The query executing method of claim 15, wherein said type lattice of predicates and clauses includes type predicates, clause head predicates and predicate instances, and wherein said query searching includes the steps of:

choosing a predicate from said query for processing;

identifying whether a predicate instance or clause head predicate in said program matches said chosen query predicate; and binding, where a match is identified, the matching predicate instance or clause head predicate with said chosen query predicate.

17. The query executing method of claim 16, wherein said predicate choosing step includes choosing from said query a predicate having a highest rank as defined by said pre-assigning ranking step.

18. The query executing method of claim 17, wherein said query searching further comprises the steps of:

determining whether said chosen query predicate matches more than one predicate instance or clause head predicate in said program; and selecting, where multiple matches are identified, one of said matching predicate clauses for initial binding with said chosen query predicate.

19. The query executing method of claim 18, wherein said selecting step includes selecting the matching clause having the highest relative ranking for initial binding with said chosen query predicate.

20. The query executing method of claim 19, wherein an instance of predicate is assigned the lowest ranking during said rank pre-assigning step and a clause head predicate of said program which is not a type predicate is assigned the highest ranking during said rank pre-assigning step.

21. The query executing method of claim 20, wherein each clause head predicate which is also a type predicate of said program as defined defined during said rank pre-assigning step is assigning a rank proportional to the maximum rank of the body predicates in the clause containing said clause head predicate.

* * * * *